United States Patent [19]
Holmes

[11] 3,974,975
[45] Aug. 17, 1976

[54] DOUBLED-END CARTRIDGE TAPE

[75] Inventor: Dennis K. Holmes, Bluffton, Ind.

[73] Assignee: Steve P. Double, Markle, Ind. ; a part interest

[22] Filed: Apr. 7, 1975

[21] Appl. No.: 566,030

[52] U.S. Cl. .......................... 242/55.19 A; 360/93; 360/132
[51] Int. Cl.² ......................................... B65H 17/48
[58] Field of Search ............. 242/55.19 A, 55.19 R, 242/55.18, 71.8, 74; 360/93, 94, 90, 91, 134, 132

[56] References Cited
UNITED STATES PATENTS

| | | | |
|---|---|---|---|
| 3,281,039 | 10/1966 | Foley | 360/134 X |
| 3,420,461 | 1/1969 | Cousino | 242/55.19 A |
| 3,458,667 | 7/1969 | Burquez | 242/55.19 A UX |

Primary Examiner—George F. Mautz
Attorney, Agent, or Firm—Lundy & Welch

[57] ABSTRACT

An improved cartridge tape that is wound up upon a tape spool, and consisting of an endless tape located in a tape player cassette, the tape being able to be unwound from the center of the tape roll and wound up around the outer edge of the roll, so that either end of the roll can be fed for tape playing. The tape is enclosed in a housing having substantially identical opposite ends each of which is adapted to be received in a tape player. Means engaging the tape are interposed between the opposite ends of the housing for rotating the tape 180° in a first direction and 180° in the opposite direction whereby opposite sides of the tape are exposed at the opposite ends of the housing permitting intelligence to be recorded and "played back" on both surfaces of the tape.

7 Claims, 8 Drawing Figures

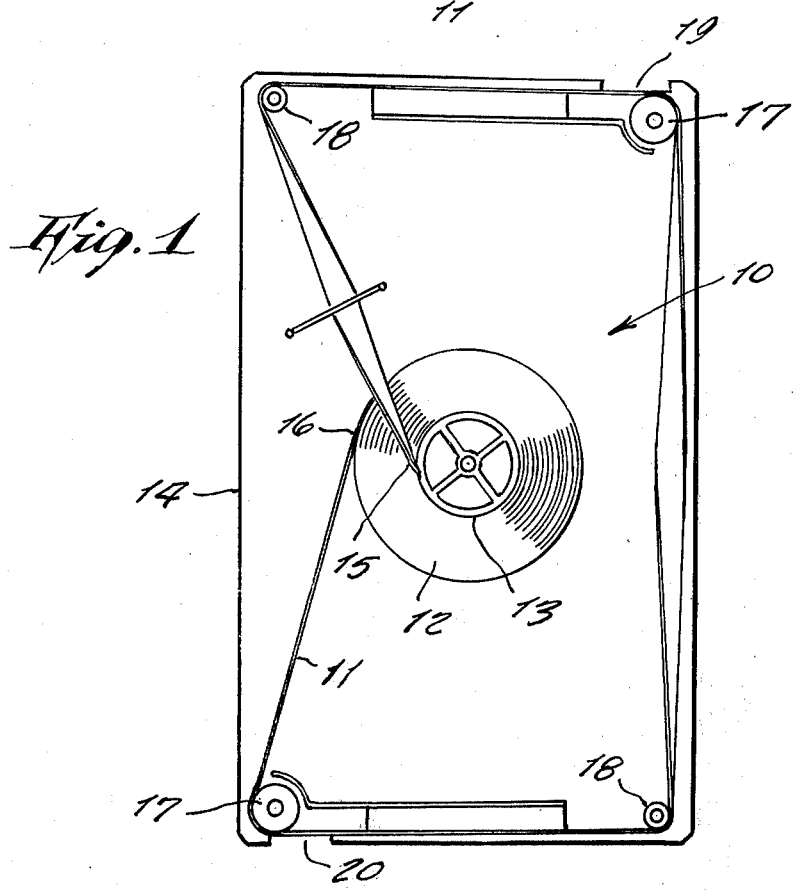

DOUBLED-END CARTRIDGE TAPE

This is a continuation in part of U.S. Pat. application, Ser. No. 445,147, filed Feb. 25, 1974, now abandoned.

BACKGROUND OF THE INVENTION

1. Field of the Invention

This invention relates to cartridge tapes. In particular the invention embodies a double-end cartridge tape for use in cartridge tape playing devices, the tape having substantially identical end portions each of which can be selectively inserted into a tape player and including means for reversing the tape therein such that opposite surfaces of the tape will be exposed to the pick-up mechanism of the tape player when the opposite ends of the cartridge are inserted thereinto respectively.

2. Description of the Prior Art

Cartridge tape players have become a popular alternative to the conventional phonograph or record player. Cartridge tape systems have greater convenience and are particularly well adapted for use in portable equipment and automotive and the like applications. A conventional magnetic tape utilized in such cartridges typically includes a plurality recording tracks with two tracks being utilized for a stereo recording. Because the shape and dimensions of the cartridge housing are substantially fixed by requirements of standardized cassette recording and playback equipment, the recording capacity of a standard cassette is limited. This problem is further accentuated by the current growing popularity of four channel sound recorders which require twice as much tape capacity as stereo recordings.

This problem can be solved by providing more cassettes. However, listeners have become accustomed to purchasing cartridges having a certain capacity typically measured in terms of numbers of songs or minutes of playing. The cassette itself also represents a significant portion of the cost of a tape cartridge. There therefore exists a need for an improved tape cartridge having increased recording capacity, the cartridge being compatible with existing tape players and which does not significantly increase the cost of the cartridge assembly itself.

SUMMARY OF THE INVENTION

The present invention is a double-end cartridge tape for use with a tape player having a tape cartridge receptacle. There are means within the cartridge receptacle for engaging the cartridge, and magnetic pick-up means for transducing intelligence on the magnetic tape. The cartridge comprises a housing having substantially identical end portions dimensioned to be received individually within said receptacle. Each of the end portions includes means cooperative with the engaging means for holding the housing within the receptacle. A window is provided in each of the end portions and a tape spool is rotatably mounted within the housing. An endless ribbon of magnetic tape having front and back recording surfaces is wound on the spool and is provided with a loop portion. Means are provided in the housing for guiding the loop portion past the windows such that the pick-up means engages the loop portion through respective ones of the windows when respective ones of the end portions are received within the receptacle. Means are also provided in the housing interposed between the windows for imparting a 180° twist to the tape in a first rotational direction and second means are interposed between one of the windows and the spool for imparting a second 180° twist to the tape in a rotational direction opposite said first mentioned rotational direction.

By utilizing a magnetic tape which can be recorded on both of its surfaces, the cartridge tape of the present invention enables recording and playing back of intelligence on both sides of a tape thereby doubling the recording capacity of the tape. The housing or cartridge itself is somewhat longer than a conventional tape cartridge but otherwise utilizes the components of a conventional tape cartridge without significant duplication of components.

A principal object of the present invention is to provide a cartridge tape for use in a tape player cassette, the tape being wound into a roll, and allowing the end of the roll to be unwound so to be fed to a recording or playing head of a tape player.

Another object is to provide a cartridge tape which is of endless type so that it can be wound and unwound in either direction.

Other objects are to provide a double-end cartridge tape which is simple in design, inexpensive to manufacture, rugged in construction, easy to use, and efficient in operation.

Yet another object of the invention is to provide a cartridge tape having increased recording capacity.

Still another object of the invention is to provide such a tape which permits recording of intelligence on both sides of a magnetic tape.

Another object of the invention is to provide such a cartridge tape which increases the recording capacity of a cassette without substantially increasing the complexity or cost thereof.

BRIEF DESCRIPTION OF THE DRAWINGS

These and other objects will be readily evident upon a study of the following specification and the accompanying drawings, wherein:

FIG. 1 is a plan view of the present invention showing the tape within the interior of a tape player cartridge or cassette.

FIG. 2 is an end view thereof.

FIG. 3 is an opposite end view thereof.

FIG. 4 is a perspective view of the tape roll.

DESCRIPTION OF A SPECIFIC EMBODIMENT

Figure 6A:
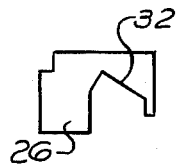
FIGS. 6a, b, and c, illustrate details of the tape rotating means for use with the present invention.

Referring now to the drawings in detail, the reference 10 represents a double-end cartridge tape according to the present invention, and which includes an endless tape 11 wound up into a roll 12 around a spool 13 contained within a cartridge 14. Accordingly the inner end 15 of the tape roll extends outward in order to form a continuation with the outer end 16 of the tape roll.

The portion of the tape that is not wound up on the roll 12 loops around pulleys 17 and guides 18; the tape being movable behind cartridge windows 19 and 20 for communication with recording and playing heads of a tape player.

The cartridge 14 is typically provided with engaging means as at 21 which cooperate with a conventional detent mechanism (not shown) within a receptacle of a tape player. The receptacle (not shown) of the tape player (not shown) is complementary to the outside dimensions of the cartridge 14 and has disposed therein a conventional magnetic pick-up or the like device for transducing or otherwise generating an electrical signal corresponding to the intelligence recorded on the magnetic tape 11. When the cartridge 14 is inserted into the receptacle, the magnetic pick up engages the outside surface of the tape 11 through one of the windows 19 or 20. It will be observed that both ends of the cartridge 14 are similarly dimensioned and shaped whereby either end portion 22 or 23 of the cartridge 14 can be inserted thereinto with the magnetic pick-up engaging the tape through the respective one of windows 19 or 20. Also conventionally, a pad of resilient material such as sponge rubber or the like 24 is mounted within the cartridge 14 behind those portions of the tape 11 in registry with the windows 19 and 20 to thereby maintain the tape 11 in positive engagement with the magnetic pick-up.

The looped portion of the tape 25 between ends 15 and 16 thereof is guided adjacent the periphery of the cartridge 14 by means of the rollers and guides 17, 18.

Figure 6B:
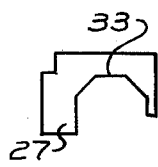
Figure 6C:
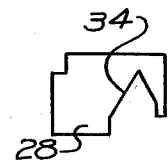
Figure 5:
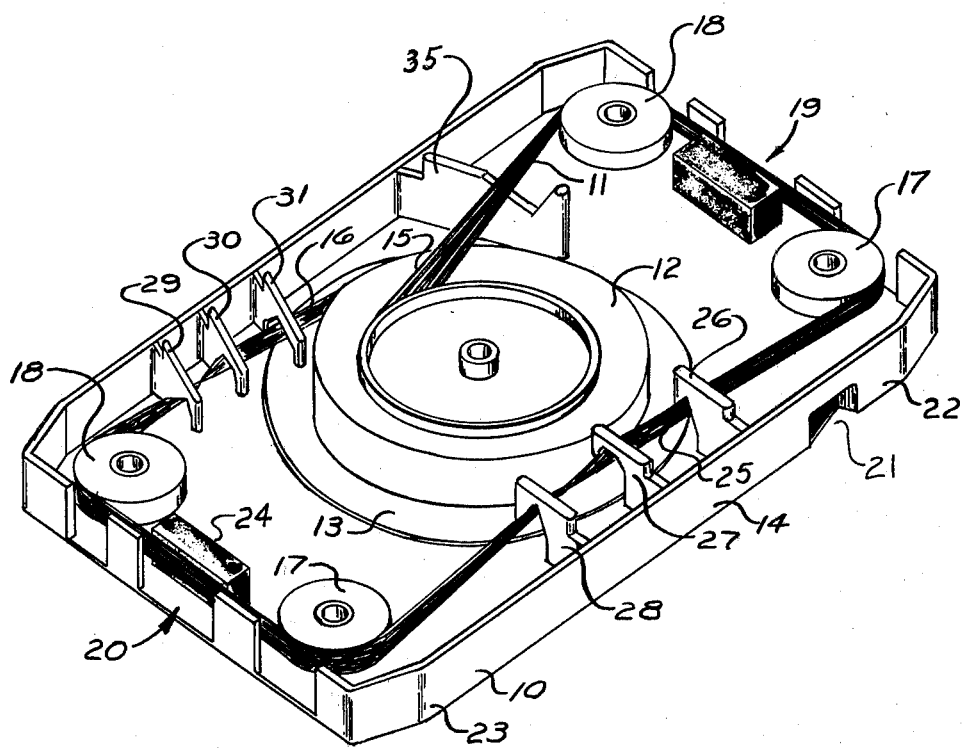
FIG. 5 is a perspective view showing details of the double-end cartridge tape with the tape twisting or reversing means.

The magnetic tape 11 is itself provided with a suitable recording medium, typically a metallic oxide, on both surfaces thereof and is further provided with a suitable magnetic shield between the two magnetic layers whereby both sides of the tape can be recorded with different intelligence. The looped portion 25 of the tape has imparted thereto a first 180° rotation as it moves between windows 19 and 20 by means of suitable rotating means 26, 27, and 28. Consequently, the opposite surfaces of tape 11 are exposed to windows 19 and 20, respectively. As the tape moves past window 20 and back to the roll 12, a second 180° rotation is imparted thereto in the opposite rotational direction to the first rotation imparted thereto by a second group of means 29, 30, and 31. Means 26, 27, and 28, and means 29, 30, and 31 may comprise simple guide elements such as illustrated in FIGS. 6a through 6c with each element 26, 27, and 28 imparting a 45° rotation to the tape looped portion 25. Elements 26, 27, and 28 are preferably fabricated from a highly lubricous plastic material such that they will not scratch, or otherwise mar the surface of tape 11. Elements 29, 30, and 31 are similar to elements 26 through 28 with oppositely oriented bearing surfaces 32, 33, and 34, respectively to thereby effect the opposite rotation. As shown in FIG. 1, the rotating means can comprise a single guide element as at 35 disposed between the roll 12 and the first guide element 18 and the second 180° rotation of the tape can be effected by placing a twist in the tape between pulley or roller 17 and guide 18, i.e., between windows 19, and 20.

In use, the tape cartridge 14 can be inserted into a tape player (not shown) with either end portion 22 or 23 thereof being received into the receptacle of the tape player. Depending upon which end portion 22 or 23 is inserted into the receptacle, respectively opposite surfaces of tape 11 will be exposed to the magnetic pick-up device within the tape player. Correspondingly, intelligence recorded on the tape will be different depending upon which end of the tape is inserted into the receptacle. It will further be observed that, because both surfaces of the tape can be recorded with different intelligence, the recording capacity of the cassette is essentially doubled without significantly increasing the dimensions of the cassette 14. Further, the major portions of the cartridge 14 are identical to a conventional cartridge (not shown) with only the need for the rotating means and an additional pair of guides and pulleys being required to effect this increased recording capacity.

The cartridge will otherwise function in an identical manner with a conventional tape cartridge whereby it will typically include a plurality of recording tracks on each surface of the tape enabling recording of stereophonic, quadraphonic or the like intelligence thereon.

It is now evident that in operative use, the tape 11 can unwind from the roll inner end 15 and wind up on the roll outer end 16. This operation is continuous and the tape is in fact an endless ribbon.

In one design, the spool 13 may be made diametrically changeable so to accommodate tape unwinding or winding thereupon, comprising semi-circular halves held adjustably apart by springs. Modifications and other embodiments of the present invention will be apparent to those skilled in the art in view of the above disclosure.

While there have been described above the principles of this invention in connection with specific apparatus, it is to be clearly understood that this description is made only by way of example and not as a limitation to the scope of the invention.

What is claimed is:

1. For use with a tape player which includes a tape cartridge receptacle having means therein for engaging said cartridge and magnetic pick-up means for transducing the intelligence on a magnetic tape, a double-end tape cartridge comprising a housing having substantially identical end portions dimensioned to be received selectively and individually in said receptacle, each said end portion including means cooperative with said engaging means for holding said housing within said receptacle, a window in each said end portion, a tape spool rotatably received within said housing, an endless ribbon of magnetic tape having front and back recording surfaces, said ribbon being wound on said spool and including a loop portion, means for guiding said loop portion past said windows, said pick-up means engaging said loop portion through a respective one of said windows when respective ones of said end portions are received in said receptacle, said tape including first means disposed between said windows for imparting a 180° twist to said tape in a first rotational direction, second means disposed between one of said windows and said spool for imparting a 180° twist to said tape in a rotational direction opposite said first rotational direction.

2. The cartridge of claim 1 further including means for guiding said looped portion past said windows with the surface thereof disposed generally parallel to the plane of said windows, said first guide means comprising at least one element secured to said housing and slidably engaging the surface of said tape.

3. The cartridge of claim 2 wherein said second guide means includes at least one second element secured to said housing and including a surface slidably engaging the surface of said tape.

4. The cartridge of claim 3 wherein said tape is an endless ribbon, said tape including a magnetic recording medium on both surfaces thereof whereby intelligence can be recorded on the opposite surfaces thereof.

5. The cartridge of claim 4 wherein said first and second guide means are made of a lubricous plastic material.

6. The cartridge of claim 5 wherein said first and second guide means each include a plurality of said elements, each of said plurality of elements imparting a fractional portion of said 180° twist to said tape.

7. The cartridge of claim 6 wherein said looped portion guiding means, said tape spool, and said first and second guide means are arranged in generally coplanar relationship.

* * * * *